US010582698B2

(12) United States Patent
Rice

(10) Patent No.: US 10,582,698 B2
(45) Date of Patent: Mar. 10, 2020

(54) PET TRAINER AND EXERCISE APPARATUS

(76) Inventor: Dillon Rice, Rancho Palos Verdes, CA (US)

( * ) Notice: Subject to any disclaimer, the term of this patent is extended or adjusted under 35 U.S.C. 154(b) by 818 days.

(21) Appl. No.: 13/068,920

(22) Filed: May 23, 2011

(65) Prior Publication Data

US 2012/0024237 A1 Feb. 2, 2012

Related U.S. Application Data

(60) Provisional application No. 61/347,306, filed on May 21, 2010.

(51) Int. Cl.
*A01K 15/02* (2006.01)
(52) U.S. Cl.
CPC .................................. *A01K 15/027* (2013.01)
(58) Field of Classification Search
CPC .......... A01K 15/027; A01K 5/00; A01K 5/02; A01K 15/00; A01K 15/02; A01K 15/021; A01K 15/028; A63B 22/0235; A63B 22/02; A63B 22/0023; A63B 22/0242
USPC ............. 119/700; 185/3, 16; 472/91; 482/54
See application file for complete search history.

(56) References Cited

U.S. PATENT DOCUMENTS

| | | | | |
|---|---|---|---|---|
| 5,100,127 A * | 3/1992 | Melnick | ............... | A01K 15/027 119/700 |
| 5,277,150 A * | 1/1994 | Rhodes | ................ | A01K 15/027 119/700 |
| 6,231,527 B1 * | 5/2001 | Sol | ........................ | A61B 5/1038 348/143 |
| 6,347,603 B1 * | 2/2002 | Felger | .................. | A01K 15/027 119/700 |
| 7,536,977 B1 * | 5/2009 | Williams | ............. | A01K 15/027 119/700 |
| 8,794,648 B2 * | 8/2014 | Woelfel | ................. | A63B 22/02 119/700 |
| 2002/0002103 A1 * | 1/2002 | Watterson et al. | ............. | 482/54 |
| 2002/0022551 A1 * | 2/2002 | Watterson | ............... | H04L 67/02 482/8 |
| 2007/0275830 A1 * | 11/2007 | Lee | ....................... | A61B 5/1038 482/54 |
| 2008/0287266 A1 * | 11/2008 | Smith | .................. | A01K 11/001 482/54 |
| 2010/0160115 A1 * | 6/2010 | Morris | ............... | A63B 22/0235 482/4 |

OTHER PUBLICATIONS

NPL "does your dog watch TV".*

* cited by examiner

*Primary Examiner* — Thanh Pham
(74) *Attorney, Agent, or Firm* — Richard B. Cates

(57) ABSTRACT

The invention is a device for exercising a pet. One embodiment of the invention is a combination of a treadmill and control configured to motivate a pet to use the treadmill responsive to motivation provided to the pet in the form of visual, audio, aromatic, and/or food rewards. Another embodiment of the invention is a device having a motivation control system configured to be secured to and/or adjacent to a separate treadmill, with the device controlling operation of the treadmill and the motivational control system providing appropriate motivation to the pet to use the treadmill.

11 Claims, 8 Drawing Sheets

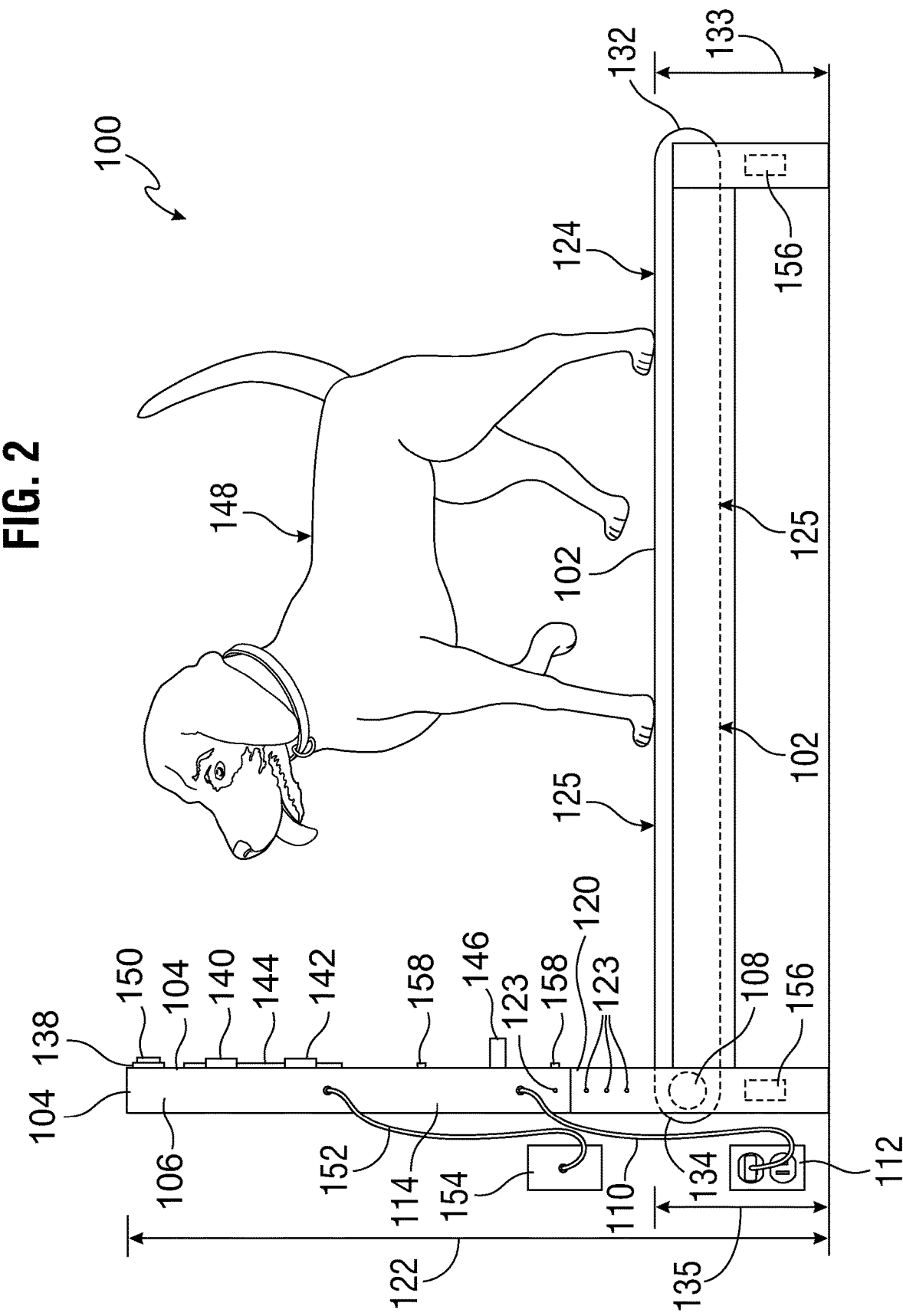

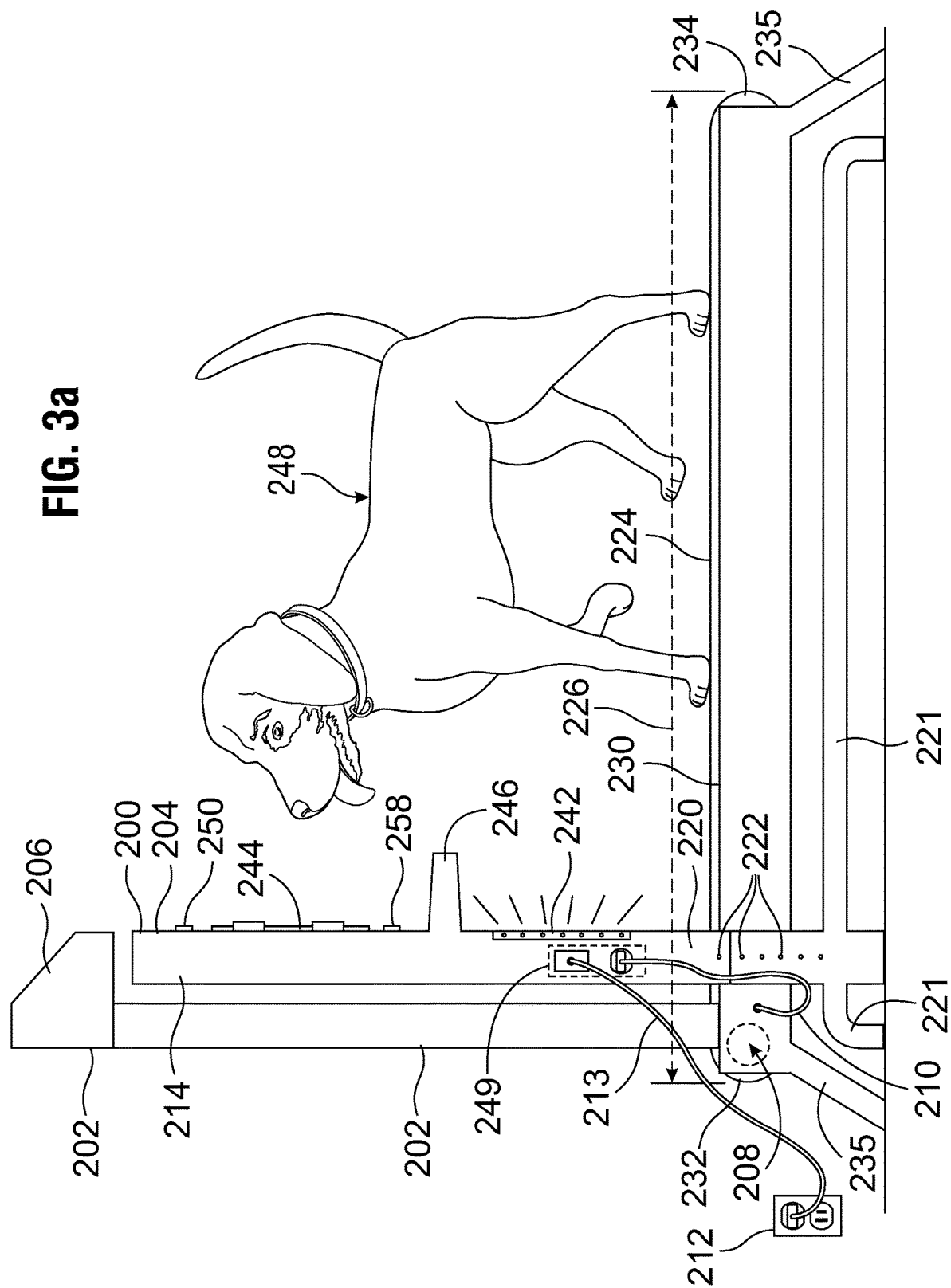

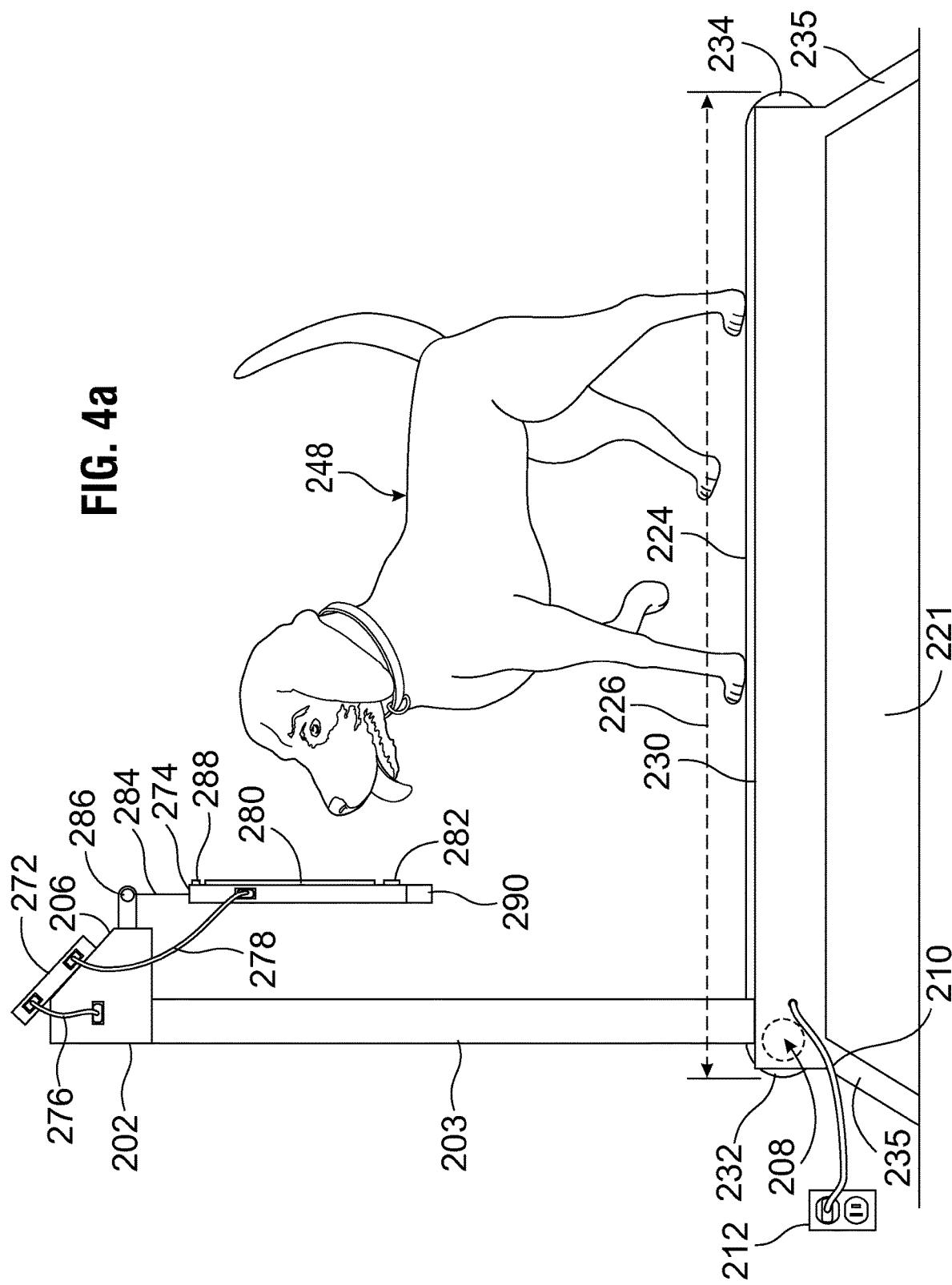

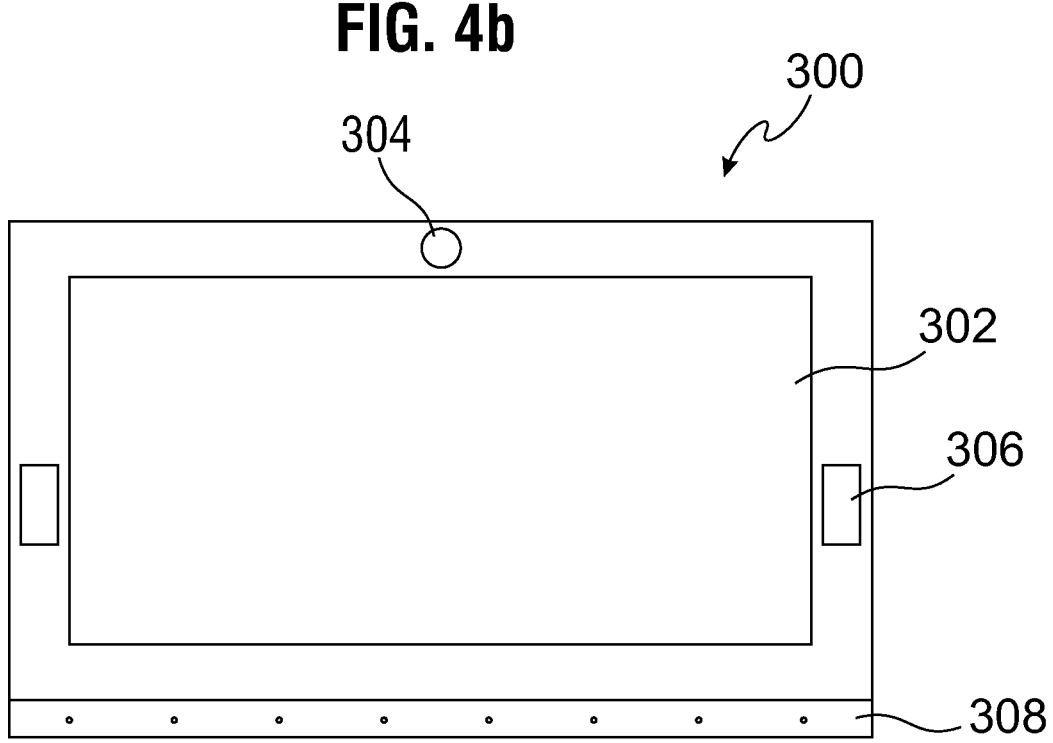

PET TRAINER AND EXERCISE APPARATUS

RELATED APPLICATIONS

The present application claims priority from U.S. Provisional Patent Application No. 61/347,306, filed May 21, 2010 and entitled "Pet Trainer and Exercise Apparatus," the entire contents of which are incorporated herein by reference.

BACKGROUND

The invention relates to training and exercising pets, and more particularly to an apparatus, system, and method for training and exercising animals without the owner being present Exercise is critical to an animal's health, both physically and mentally. Household pets which receive regular exercise may be in better physical health and may also be better behaved. However, many pet owners do not always have the time to exercise their animals. Many busy individuals may find that their work schedule can interfere with regularly exercising their pets. Even individuals with relatively open work schedules can have problems in exercising their pets. For example, one of the most common methods for exercising pets, and particularly for dogs, is to take the pet on a leash for a walk or run. However, inclement weather can interfere with such activities. Moreover, even when weather is good, many pets are left home alone while their owners are at work or otherwise occupied.

Treadmills have been developed to exercise people and animals. Current animal trainers, treadmills, and other exercise devices require a person to prepare and position the animal on the apparatus for training, conditioning, and activity. These devices also require a person to be present to activate the apparatus and to supervise/monitor the animal while on the apparatus. For example, U.S. Pat. No. 6,058,888 to Nichols discloses a pet treadmill having a detachable harness for fitting onto the pet. U.S. Pat. No. 7,536,977 to Williams discloses a pet treadmill having a cage to keep the animal on the treadmill. Each of these prior art devices is designed for pet exercise with the owner or another person present to place the pet onto or into the exercise machine and to monitor, in person, the pet's exercise.

What is needed is an exercise machine which the pet can freely use on its own, without a person being present to secure the animal to the device. The current invention addresses this need.

SUMMARY OF THE INVENTION

The current invention is a device, system, and method for exercising animals. More specifically, the invention is a device (and uses thereof) configured to condition and exercise an animal in an unsupervised environment by use of a movable base or treadmill.

An embodiment of the invention is an apparatus which can summon the animal to use an exercise machine via an audible call, visual signal, and/or other motivation, such as an edible treat or the release of a toy. An apparatus according to the invention may allow for monitoring of the use of the exercising pet via data recording, image recording, and/or video recording. The data, image, and/or video may be provided online (e.g., to the pet owner) via a streaming internet connection (such as a web cam), or stored in a memory for later review by the pet owner.

In one embodiment of the invention, an apparatus to condition and exercise an animal in an unsupervised environment includes a movable exercise base, such as a treadmill, having a motivational control system. The motivational control system may be provided as a part of the exercise base (i.e., the motivational control system and the exercise base are provided (e.g., manufactured, packaged, sold, etc.) a single unit). Alternatively, the motivational control system may be provided as a separate unit configured to be used with a separately (e.g., previously) purchased exercise base. For example, the motivational control system may be configured for use with a treadmill which was originally intended for use for human exercise. Such a separate treadmill will typically have its own treadmill control system, separate from any pet motivational control system. In such an embodiment, the human user could use the exercise treadmill for his/her own workout using the separate treadmill control, and then activate the pet motivation control system to encourage the pet to use the treadmill.

The motivational control system may have different components, such as a control component and a motivational component. The motivational control system may be a single assembly with the treadmill, or may be one or more separate/separable modules (e.g., control component module and motivational component module) which can be removably secured to and/or adjacent the treadmill or each other. For example, the motivational component and/or control component may be permanent (i.e., built-in) components of the treadmill, such as a video display and/or control buttons/processors/memory built into a stand which forms a part of the treadmill assembly (such as the embodiment depicted in FIGS. 1a-1c discussed below). The motivation control system may be a separate assembly from the treadmill assembly (such as the embodiment depicted in FIGS. 3a-3b discussed below).

The motivation control system may itself have a control component and motivation component and additional components (e.g., monitoring component, etc.), and one or more of the components may be distinct and separable modules from the other components, particularly where the motivation control system is itself separate/separable from the treadmill assembly. For example, the motivational control system may include a control component module (e.g., a small computer or other processor) and a separate motivational component module or modules (e.g., a speaker and/or image display and/or treat dispenser), with the control component module linked to the motivation component module (or other component modules) via a physical (e.g., wired) communications link (which may operate via a USB port or similar connections on one or more of the linked components) and/or linked via a wireless communications link. The motivation component module(s) is preferably configured to be positioned on or immediately adjacent the treadmill assembly, such as at a front portion thereof, in order to provide motivations which will draw the dog or other pet animal onto the treadmill surface with the dog facing forward on the treadmill with its head facing the motivation component(s). For example, the motivation component module may hang from or otherwise be secured to or positioned at/adjacent a stand or other portion of the treadmill assembly positioned at the front of the treadmill assembly. For example, in the case of a motivation component having an image display (such as a video display), the motivation component may be positioned at the front of the treadmill with the image facing back toward the rear of the treadmill and with the image at or about at (e.g., just above or just below) the level of the pet animal's head (and more specifically the pet animal's eyes) when in a walking position so that the pet animal can easily view the image display when walking on the treadmill. A motivation component having a speaker may be positioned at or adjacent the front of the treadmill, so that an animal exercising on the treadmill will be facing toward the sound provided by the speaker.

The apparatus allows for summoning, signaling, calling, or otherwise motivating the animal to use the exercise base of the apparatus. The motivation for use of the apparatus can be the use of sound(s) (such as a recording or transmission of the owner's voice), light, image displays, aromas, and/or edible treats. In one embodiment of the invention, the motivation (such as image displays and/or edible treats) are provided at a position (i.e., height, etc.) in front of and approximately level with the pet's head when the pet is exercising, so that the pet can easily watch (for displays) or retrieve (for treats) the motivation while using the exercise base. Providing the motivation at such a position may also help the pet to maintain the proper exercise position on the exercise base.

The apparatus can be configured to allow for monitoring of the use of the exerciser by the pet via recording (data, image, and/or video) or via transmission (data, image, and/or video) via the internet or other transmission.

An apparatus according to an embodiment of the invention may include sensors to monitor the pet's position and other usage of the apparatus. For example, the apparatus can be configured to shut down, or not to start initially, if the pet is not determined (via sensors or otherwise) to be in a correct exercise position. The apparatus may be configured to speed up and/or slow down the exercise base responsive to the sensors. For example, if the sensors indicated the pet was falling behind in the exercise (e.g., the pet was beginning to slip toward the back of the treadmill), the apparatus could be configured to slow down the treadmill to accommodate the pet's limitations. Similarly, if the sensors indicated that the pet was easily keeping up with the treadmill, then the apparatus could be configured to speed up the treadmill. The sensors could also be used to determine when motivational rewards were provided. For example, if the sensors indicated the pet was falling behind (e.g., slipping toward the back of the treadmill), the apparatus could provide additional motivation, such as the release of food reward(s) and/or providing audio of the pet owner's voice urging the pet to go faster.

In one embodiment, the invention comprises an exercise apparatus (such as a treadmill) having a motivation apparatus and control system that controls the operation of the exercise apparatus as well as the provision of the pet rewards/motivations. In such an embodiment, the exercise apparatus and motivational apparatus form a single stand alone unit.

In one embodiment, the invention comprises a motivational apparatus having a motivational control system. The motivational apparatus is configured to be secured to, and/or placed over or adjacent to, or otherwise interact with, an existing exercise apparatus (such as treadmill) having its own exercise apparatus control system. The motivation control system is configured to communicate (via wired or wireless connection) with the exercise apparatus control system of the existing exercising apparatus in order to control the operation of the exercise apparatus.

An embodiment of the invention is a method for training a pet to use an exercise apparatus when no person is present. The use of the visual, audio, aromatic, and/or food motivational prompt will encourage the pet to board the exercise machine for exercise. The apparatus will then operate in a fashion to exercise the animal while providing one or more visual, audio, aromatic, and/or food rewards and reinforcements.

A method for exercising a pet animal according to an embodiment of the invention comprises providing a treadmill device with a support frame, one or more rollers, a driving motor, and a treadmill belt, wherein the treadmill belt passes over the one or more rollers and defines a treadmill upper surface, treadmill lower surface, treadmill belt front end, and treadmill belt back end, wherein the driving motor drives rotational movement of the treadmill belt over the one or more rollers; providing a motivational control system communicatively linked to the treadmill, wherein the motivational control system comprises a control component and a motivational component, wherein the control component provides operational control signals to the treadmill and motivational control signals to the motivational component, the control component comprising a microprocessor and a memory, wherein the motivational component is configured, responsive to motivational control signals from the control component, to provide one or more exercise motivational signals to a pet animal which is standing on or adjacent the treadmill upper surface; without the physical presence of a human supervisor at the treadmill device, providing a startup signal from the control component to the treadmill to activate the driving motor and thereby cause the treadmill belt to rotate so that the treadmill upper surface moves in a direction from the front end to the back end of the treadmill belt; with the treadmill surface moving in a forward direction and without the physical presence of a human supervisor at the treadmill device, activating the motivational component to provide one or more of the exercise motivational signals to encourage the dog to walk in a forward direction on the treadmill upper surface, wherein activating the motivational component comprises providing a motivational component activation signal from the control component to cause the motivation component to provide the one or more exercise motivation signals. The motivational component may comprise a speaker, and the one or more exercise motivational signals may comprise the sound of a voice of an owner of the pet animal, and activating the motivational component to provide one or more of the exercise motivational signals comprises transmitting the sound of the voice of the owner via the speaker. The motivational component may comprise a video display, and activating the motivational component to provide one or more of the exercise motivational signals may comprise providing a moving video of a prey animal on the video display. The method may comprise providing a monitoring component, wherein the monitoring component is configured to monitor the pet animal's position on the treadmill surface; and without the physical presence of a human supervisor at the treadmill device, monitoring the pet animal's position on the upper treadmill surface via the monitoring component to detect whether the pet animal is in a proper exercise position; and upon detecting that the pet animal is not in a proper exercise position, and without the physical presence of a human supervisor at the treadmill device, automatically ceasing rotation of the treadmill belt.

The method may include providing a monitoring component, wherein the monitoring component comprises a camera taking one or more images a space immediately above the upper treadmill surface; monitoring the pet animal's position on the upper treadmill surface with the monitoring component, comprising taking one or more images of the pet animal via the camera; providing a remote monitoring device (which could be a PC, cell phone (e.g., smart phone), or similar device with display) having a display configured to present received images to a human user. The method could include providing a communication link between the monitoring component and the remote monitoring device; and without the physical presence of a human supervisor at the treadmill device, transmitting the one or more images of the pet animal to the remote monitoring device via a real-time communication link, whereby a human user of the remote monitoring device can view the images of the pet animal in real-time. The motivational component comprises a speaker, the method further comprising: providing a remote device (which could be a PC, cell phone (e.g., smart phone), or similar device with display) comprising a microphone configured to receive sounds made by a human user and a transmitter configured to transmit signals corresponding to the sounds made by the human user; providing a communication link (which could be real-time) between the monitoring component and the remote device; and without the physical presence of a human supervisor at the treadmill device, providing sounds from the human user to the microphone, transmitting signals corresponding to the sounds made by the human user from the remote device to the motivation component, and recreating the sounds provided by the human user to the pet animal via the speaker of the motivational component—which could be performed in real-time. The motivational component may be configured to provide a calling signal to encourage the pet animal to come to the treadmill and to step onto the treadmill surface, and the method may further comprise: without the physical presence of a human supervisor at the treadmill device, activating the motivational component to provide the calling signal to encourage the pet animal to come to the treadmill and to step onto the treadmill surface, wherein providing the calling signal is performed prior to activating the motivational component to provide the one or more exercise motivational signals.

Further aspects of the invention are discussed below and depicted in the attached drawings.

BRIEF DESCRIPTION OF THE DRAWINGS

FIG. 1b depicts a top view of the apparatus of FIG. 1a;

FIG. 2 depicts a side view of the apparatus of FIG. 1a, with a pet positioned on the treadmill;

FIG. 3a depicts a side view of an embodiment of the invention wherein a pet-motivating apparatus is used to control a separate treadmill apparatus according to an embodiment of the invention;

FIG. 4a depicts a side view of an embodiment of the invention wherein a pet-motivating apparatus with separate control module and motivation module is used to control a separate treadmill apparatus according to an embodiment of the invention; and FIG. 4b depicts a front view of a motivation module including sensors components according to an embodiment of the invention.

DETAILED DESCRIPTION OF THE INVENTION

Figure 1A:
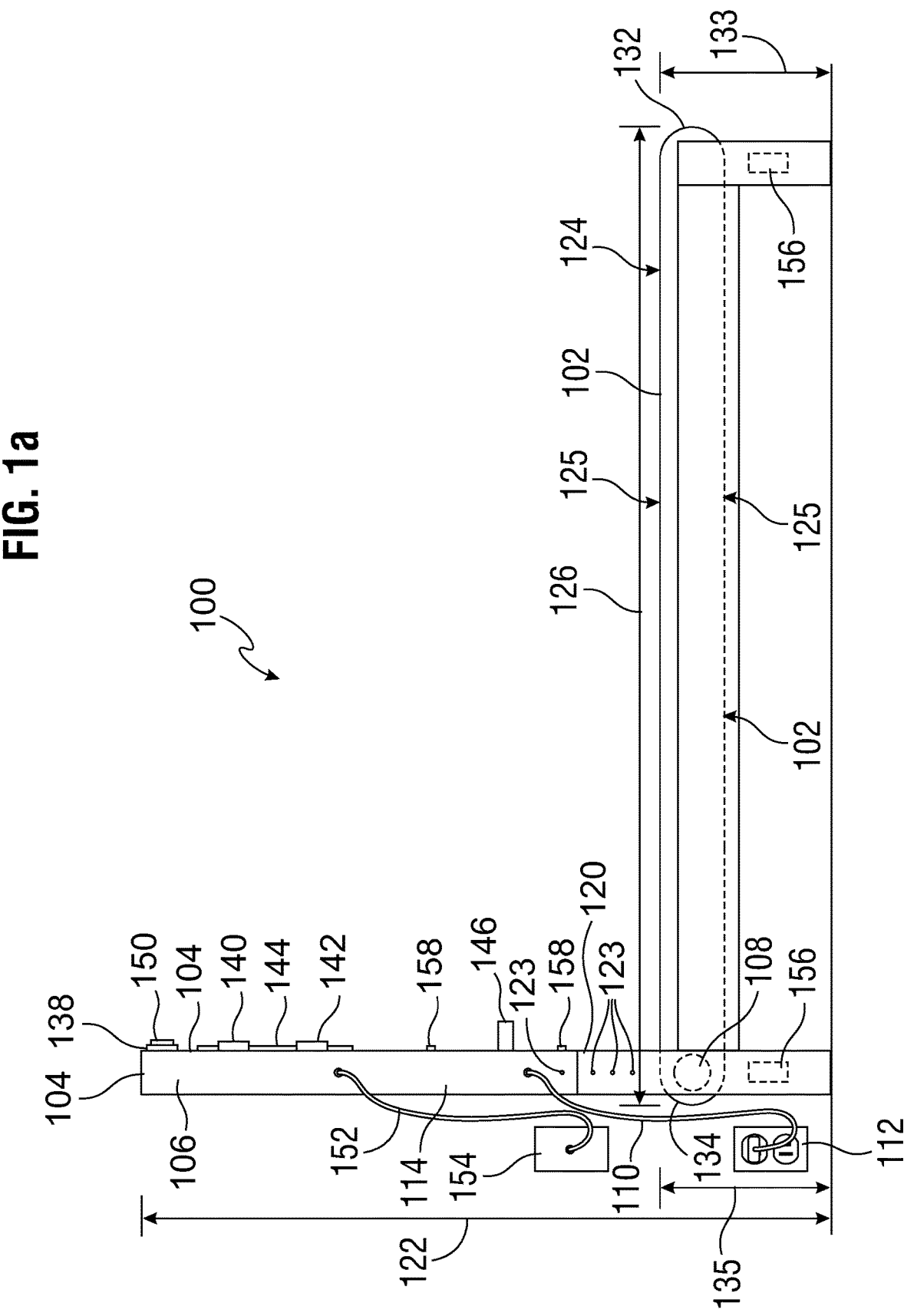
FIG. 1a depicts a side view of an apparatus according to an embodiment of the invention.
Figure 1B:
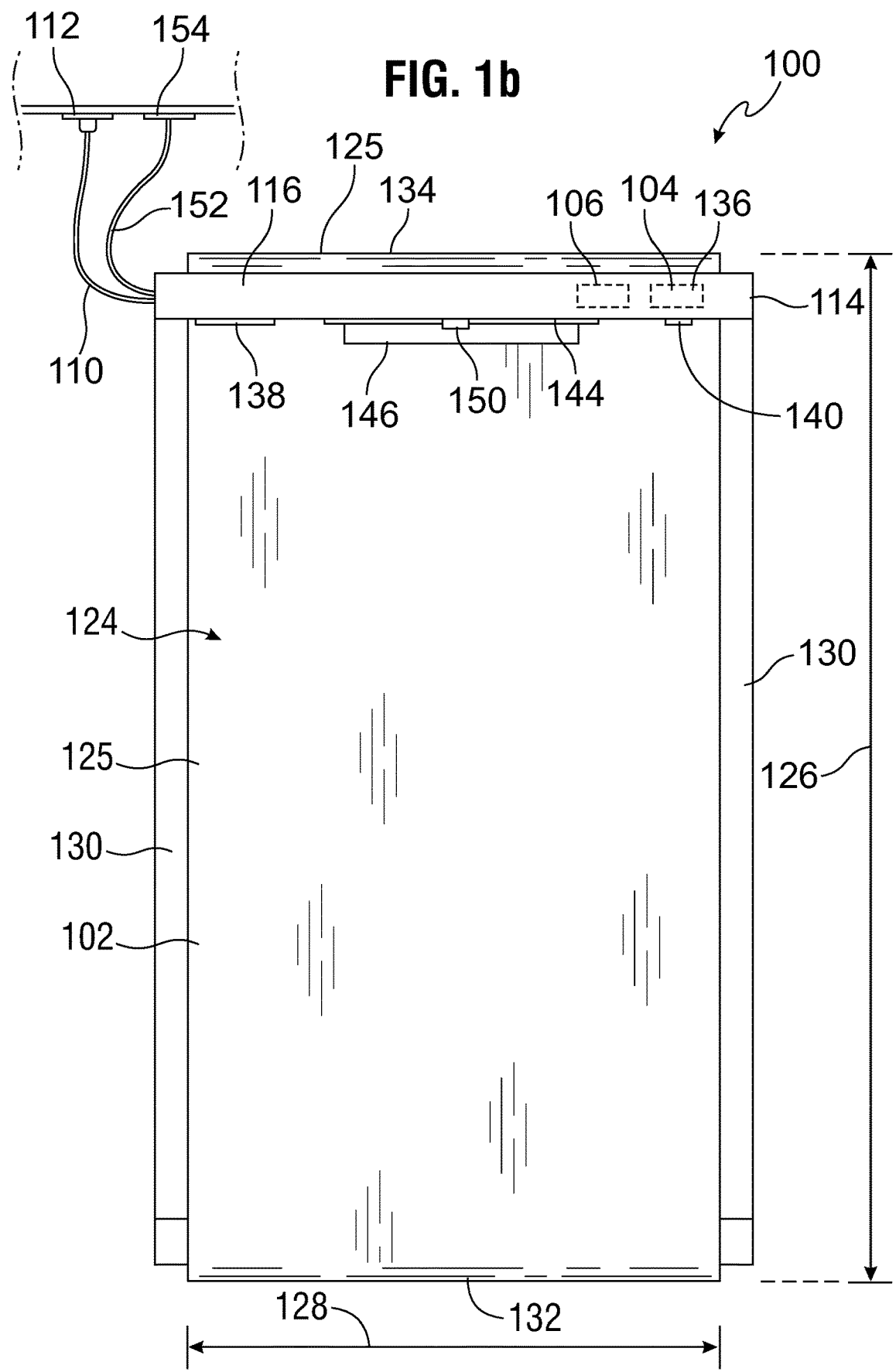
Figure 1C:
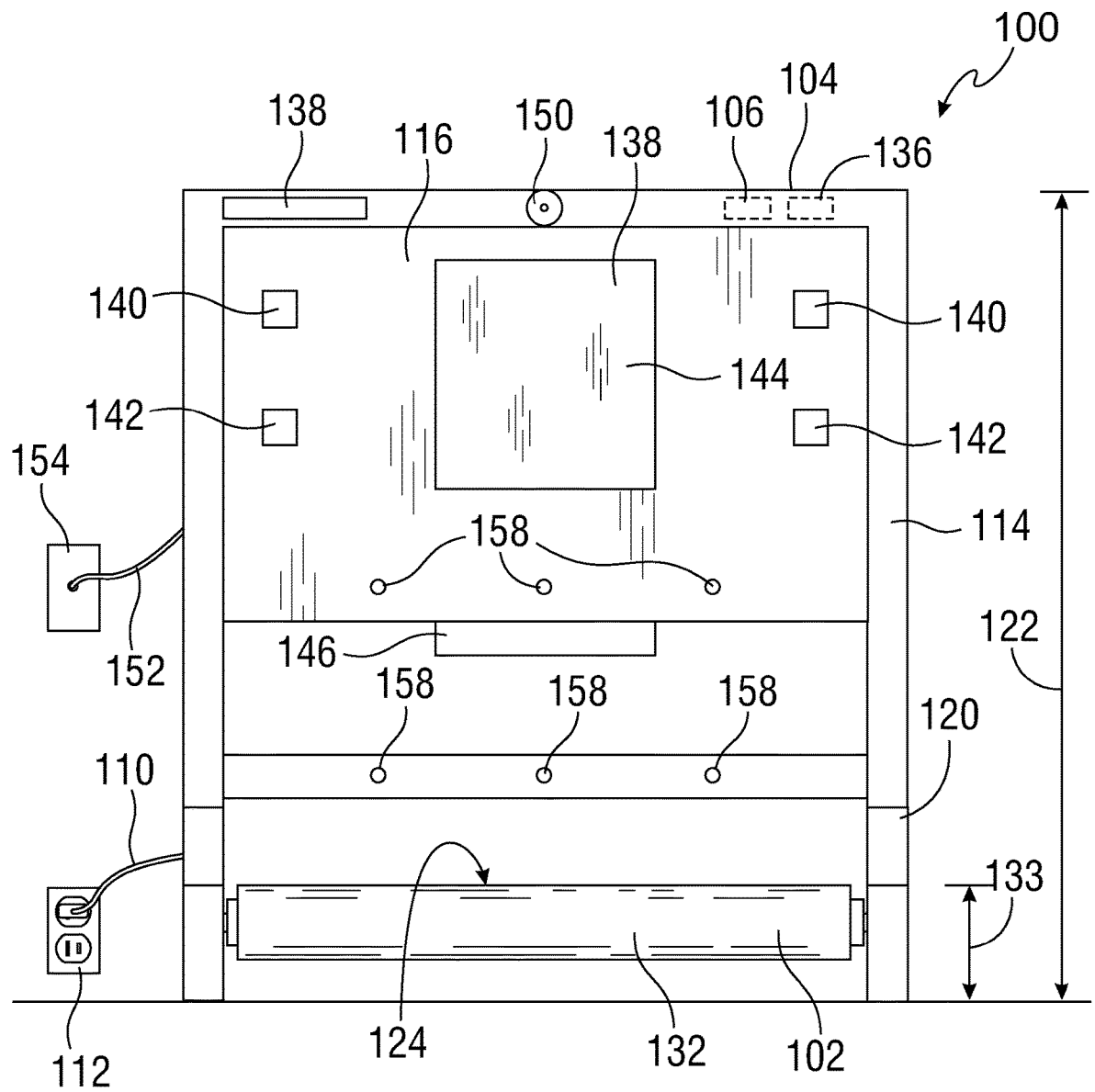
FIG. 1c depicts a back view of the apparatus of FIGS. 1a and 1b.

FIGS. 1a-1c depict various views of an exercise apparatus 100 according to an embodiment of the invention. The apparatus 100 includes an exercise base, which in the particular embodiment depicted is a treadmill 102. The apparatus 110 has a motivational control 104, which includes a treadmill control 106 configured to control operation of the treadmill 102 (including, e.g., treadmill angle, treadmill speed, etc.) by controlling operation of the treadmill 102, including controlling the power provided to the treadmill 102 from the treadmill motor 108 driving the treadmill (e.g., via and/or over rollers at the front 132 and back 134 of the treadmill). The apparatus 100 of the particular embodiment depicted is powered using a power cord 110 connected to a conventional wall socket 112. Note that the apparatus may include one or more batteries to power all or portions of the apparatus, such as the exercise motor and/or the motivational control, etc. Such batteries could be the primary source of power, or could be a backup or otherwise supplemental to power from a conventional power cord/wall socket.

The apparatus 100 includes a stand 114 which supports the motivational control 104. The stand 114 includes a horizontal bar 116, which in the particular embodiment of FIGS. 1a-1c has the motivational control 104 positioned thereon. The horizontal bar 116 is supported by legs 120 extending down to the treadmill 102. In the particular embodiment depicted, the lower portions of the legs 120 of the stand 114 also serve as the front supports for the treadmill 102. The legs 120 may be adjustable to change the stand height 122. In the embodiment depicted, the legs 120 can be extended or contracted to adjust the stand height 122 using a conventional height adjustment mechanism comprising pins and sockets 123. Other devices and methods for adjusting the stand height are also within the scope of the invention. For example, an embodiment of the invention could be configured with an electric motor (not shown) to electrically adjust the stand height, with such height adjustments being provided responsive to the motivational control or another control system.

In the particular embodiment of FIGS. 1a-1c, the exercise base is a treadmill 102 having a movable treadmill surface 124 defined by a continuous rotating band 125. The treadmill surface 124 has a length 126 and width 128 sized to accommodate the pet to be exercised. In the particular embodiment depicted, the treadmill sides 130 and treadmill back 132 are open and unobstructed, thus allowing a pet to easily board and exit the treadmill surface 124. In other embodiments, the treadmill sides 130 may be closed and/or other blocked (totally or partially) to prevent the pet from accidentally stepping off the sides 130. The treadmill front 134 may be blocked to prevent the pet from running off the front of the apparatus 100 when exercising.

The treadmill has a back height 133 and front height 135. In the particular embodiment depicted, the treadmill tread surface 124 is essentially parallel to the floor, so that the back height 133 is essentially the same as the front height 135 and the treadmill tread surface 124 is at an angle of essentially zero from a horizontal plane (i.e., level with the horizontal). Note, however, that some treadmills have an incline to create a slightly "uphill" sloping surface, so that the treadmill tread surface is angled upward. In some treadmills, this incline is adjustable by raising, either manually or automatically, the front of the treadmill with respect to the back of the treadmill. In treadmills having adjustable incline, the incline can be adjusted before and/or during the workout to vary the intensity of the workout. In an embodiment of the current invention, the treadmill incline can be actively adjusted from 0 to about 15 degrees or more (e.g., 30 degrees or more). This incline can be achieved via a motorized lifting mechanism or similar mechanism in the front of the treadmill, with the motorized lifting mechanism controlled via commands from the apparatus controls.

The motivational control 104 includes a computer 136 (which may be a simple circuit) and a control panel 138. The control panel 138 permits a human user to program or otherwise operate the motivational control 104 and the treadmill 102. The apparatus 100 can have variable speed and timing adjustments (which can be preprogrammed and/or entered by the pet owner remotely or via the control panel 138) in order to start up and shut down at desired times, and also to provide the desired exercise duration, speed, and intensity. In an embodiment of the invention, the apparatus 100 would be configured to start at relatively slow speeds, then incrementally move up to a faster speed, and then incrementally slow down again during the exercise period. This process of speeding up and slowing down could be repeated several times during the workout. Edible rewards could be released while the treadmill 102 was going very slowly (to more easily permit the animal to eat the reward), with visual and/or audio rewards provided when the treadmill 102 was operating at the faster speeds.

The apparatus 100 includes one or more motivational providing elements. The particular embodiment depicted includes several motivation-providing elements, including a speaker 142, an image display 144, and a food dispenser 146. The speaker 142, image display 144, and food dispenser 146 are depicted as being positioned above the front of the treadmill surface 124, where a pet using the treadmill can easily focus on each of the motivation-providing elements. Note, however, that other positions for the motivational elements are also within the scope of the invention.

The motivation elements are activated by the motivational control system 104 to summon the pet to initiate the exercise and/or conditioning activity. For example, the speaker 142 could provide a tone, chime, and/or voice to call the animal to exercise. The image display 144 could provide an image, color change, video, etc. to call the animal to exercise. The call to exercise could be visual, aromatic, audible, etc., and could be anywhere from complex to relatively simple. For example, the call to exercise might be the simple activation of a light signal, e.g., turning on a light, whether steady or flashing/strobe. Such a light signal could be provided by an image display 144 such as that depicted, or the light signal could be provided by a simple light bulb (not shown). The call to exercise may be a combination of motivational elements, such as a sound and/or visual prompt provided with the release of a food reward. The apparatus 100 may be configured to activate treadmill operation once the call to exercise is made, once the pet takes the food reward, and/or shortly after the pet takes the food reward.

The sounds provided by the speaker 142 or other sound-providing device (such as a bell or whistle) may be simple or complex. Such sounds could be provided by a bell or whistle or other mechanical sound-producing device, or by the use of recordings (e.g., of music and/or of the per owner's voice) and/or streaming sounds (provided via the internet or telephonic connections).

Visual signals could include (steady, flashing, etc.) which are activated to call the pet to exercise. The lights could be provided by simple light bulbs 140 or by an image display 144 such as the one depicted in FIGS. 1a-1c.

Other visual signals could include images and/or videos displayed on the image display 144. Such images and/or videos could be pre-recorded and/or provided via a streaming connection (e.g., via a live internet broadcast from the pet owner). The image display 144 may be accessed via computer and/or internet so that the owner can call in via a remote connection (e.g., Skype®) or other media and have the image of the owner displayed on the image display 144. With the addition of a webcam or other camera 150 to the apparatus, the pet owner could communicate with the pet during the exercise period.

Other images provided could be pleasant and/or other motivational images. For example, the image display 144 could provide a video of a walk the pet has taken, and/or video of the owner. The image could also provide video and/or images (still or moving) of other people and/or animals.

The food dispenser 146 could provide edible treats, such as food pellets, to the animal. The food dispenser 146 may comprise a dish or other treat holder into which the edible treat is dropped, so that the animal can take the treat from the dish. The food dispenser may drop the food pellet directly onto the treadmill tread surface 124 so that the animal can eat the food directly from the treadmill tread surface 124. The amount of food released to the pet can be varied from very small amounts to much larger amounts. For example, larger amounts may be dispensed for a larger pet and/or for greater exercise. Multiple food releases could occur during the exercise, with an initial release of food to call the pet to board the treadmill, and further releases to motivate the pet to continue to exercise. There could also be a release of food at the conclusion of the exercise.

As depicted in FIG. 2, a pet 148 can easily board the apparatus 100 facing toward the treadmill front 134. The pet 148 will be motivated to face toward the speaker 142, image display 144, and food dispenser 146, thus positioning the pet 148 in the ideal position to walk or run on the treadmill. When the pet uses the exercise apparatus, the apparatus could continue rewarding the animal's activity, continuously and/or at various intervals, by the use of aromatic scent, sounds, visual rewards (e.g., images and/or videos provided on the image display), and/or the release of edible reward(s). For example, the speaker 142 could be configured to provide a sound (e.g., the owner's voice, etc.) to motivate the pet to use the treadmill 102 (e.g., by having the owner's voice praise the pet 148 for the activity) and even to motivate the pet to exercise at different speeds/intensities (e.g., by having the owner's voice urge the pet to got faster or slower). The image display 144 could be configured to depict motivational images when the pet 148 uses the exercise apparatus 100. The food dispenser 146 could be configured to provide one or more treats to the pet 148. The treats could be provided to initially get the pet 148 to board the treadmill (i.e., at the start of the exercise regime). Further treats could be provided as the pet 148 continued to exercise on the apparatus 100. Such treats could be provided responsive to the amount of time that the pet 148 spends on the apparatus 100 (e.g., a treat dispensed for every 5 minutes of workout time), and/or responsive to the effort expended by the pet 148 during the workout (e.g., a treat dispensed every 100 yards travelled by the pet on the treadmill).

The motivational control 104 could be configured, via pre-programming (which could be pre-set during manufacture, programmed at home by the pet owner, and/or programmed remotely via an internet connection by the pet owner), to provide different motivational rewards (at selected intervals, etc.) and to control the treadmill to run exercises of varying length, speed, intensity (e.g., varying ramp angle, where the treadmill can vary its angle), etc., and at varying times during the day/night. The apparatus 100 may be configured to stop (preferably gradually) before dispensing a food treat in order to prevent the pet 148 from having to walk and/or run while eating the treat.

One or more of the motivational elements may be actually or effectively changeable in volume, brightness, appearance, position (e.g., changeable in height and/or side-to-side on the apparatus), etc., in order to accommodate different pets, to motivate the same pet for different exercises and/or exercise speeds, etc. For example, the image display 144 may have a screen which can be elevated and lowered, and/or be stable in height but be configured to provide an image which varies in position on the screen. The variance in position on the screen could be related to operation of the apparatus 100 and/or activity of the pet 148. As another example, where the apparatus 100 is configured to provide motivational sounds from the speaker 142, the sounds (e.g., of the pet owner's voice) could increase in volume and/or frequency responsive to the pet 148 exercising on the apparatus 100.

The apparatus of FIGS. 1*a*-1*c* has a camera 150 positioned to afford a view of the pet 148 while exercising. The camera 150 may feed the camera image (as a still picture and/or video) to a recorder located within the apparatus 100 (e.g., within the motivational control 104), and/or the camera image may be transmitted elsewhere for recording and/or viewing. For example, the apparatus 100 may include communication link 152 (which could be wired or wireless) which connects to an internet connection 154 and thus to the internet or a similar communications network. Such a camera and internet connection could enable the pet owner to remotely view the pet when the pet was exercising on the apparatus 100. The internet connection could also permit the owner to provide additional incentives, either pre-recorded or live, via the internet connection. For example, the pet owner could transmit his voice via the internet connection 154 to the apparatus speaker 142 in order to call the pet to use the apparatus. Once the pet began to use the apparatus 100, the pet owner could transmit his voice commands via the speaker 142 to urge the pet to continue to use the apparatus 100, and even to go faster, etc. The pet owner could transmit an image (still or video) of the owner's face to the image display, thus providing further incentive for the pet to focus toward the front of the apparatus and to continue exercising.

The apparatus 100 may include sensors to detect the presence and/or characteristics (e.g., height, weight) of the pet on the apparatus. For example, the apparatus 100 may include one or more weight sensors 156 in the treadmill support, with the weight sensors detecting when the pet has boarded the apparatus 100 and even providing a reading of the weight of the pet. This reading of the actual weight could be used to distinguish between different pets (such as where the pet owner has multiple pets at the location), etc. The apparatus 100 may include infrared 158 or similar detection devices (e.g., electric eye, etc.) to detect the presence and/or height of the pet on the apparatus. Such detection devices could be placed at multiple heights, or be configured to detect pets at multiple heights (e.g., via active scanning, etc.), in order to detect pets of varying sizes. Such sensors could be used to start the apparatus 100 (e.g., to start movement of the treadmill) in a desired exercise program, and also to stop the apparatus if the animal is no longer in the correct position for exercise. Such sensors could be placed at various positions on or adjacent the apparatus 100 (e.g., at the front, sides, back, etc.) in order to enhance pet safety by determining whether the pet is in a correct exercise position. For example, if sensors detected the pet to be too far forward on the treadmill or off to either side of the treadmill, the apparatus 100 could be configured to shut down operation of the treadmill and/or not to turn on the treadmill. The sensors could be adjustable in position and/or sensitivity.

Various methods of operating the apparatus are within the scope of the invention. For example, an initial call to exercise in the form of a motivation could be provided via a motivational element, with the motivation being audio, visual, food, aroma, etc. The pet would board the exercise apparatus responsive to the call to exercise. The sensors (if present) would then detect the pet being on the exercise apparatus, and possibly detect the correct position of the pet. If the pet is not on the apparatus, or is not in the correct position for exercise, the exercise apparatus would not start. A "warning" signal would be given (audio, visual, aroma, etc.) to prompt or warn the pet that the exercise apparatus will begin moving. The exercise apparatus will then begin moving, slowly at first, and then increasing in speed to a desired speed level. Additional motivations (audio, visual, aroma, and/or food) can be provided at various parts of the exercise regime to urge the pet to continue the workout. The pet will continue to use the exercise device because of its conditioned awareness that there are future motivational rewards coming.

To train the pet to use the apparatus, a human user can use various pet training methods. First and foremost in training is to assure that the pet feels safe and comfortable around the apparatus. To accomplish this, the apparatus should be placed where it is to be used on regular bases. The programming of the various stimuli should be set to the most common and/or desired times of usage. On the initial phase of training, the pet should hear, see, and/or smell the motivational elements and/or other signaling system that calls the pet to come to the training. The method may include providing the pet with an edible reward and/or other encouragement (such as verbal or physical encouragement).

When the pet realizes that the apparatus represents rewards, the next step is for the pet to understand that some action by him is required to receive additional rewards. This is where the actual exercise activity would begin.

A signal from the motivational elements would summon the pet. Upon properly boarding (or otherwise arriving at) the apparatus, the pet would receive an initial reward. The unit would begin its motion to exercise. During all stages of educating the pet on the use of the unit, human supervision may be desired. As the pet realizes that he must walk (or otherwise exercise) on the apparatus and that he is safe and comfortable on the apparatus, additional rewards could be provided (as per the human user or internal apparatus programming) to maintain the pet's interest and enthusiasm. Once the pet begins to realize that he must stay on the unit for subsequent rewards, additional programming for extended periods could be set. The duration of the exercise period could then be extended to the desired work out length, and additional work out periods during the day could be also added.

When the pet has learned how to use and understand the unit under human supervision, some trial testing may be required to make sure the pet fully understands the unit and how and why the unit works and performs as it does. This could be accomplished by having the unit left alone with the pet, and with the person observing the activity via web-cam or other means remotely from another location near the unit, such as from an adjoining room, or just sitting back and waiting for the unit to activate and then observing the pet's response to see if further training is required.

Once the person is comfortable that the pet is comfortable with the unit and understands what the unit is for, the owner may then allow the pet to work with the unit as it is programmed and without supervision.

Shorter exercise periods may be preferred during the initial training of the pet, with the length of the exercise periods increased incrementally as the pet becomes more familiar with use of the apparatus.

Figure 3B:
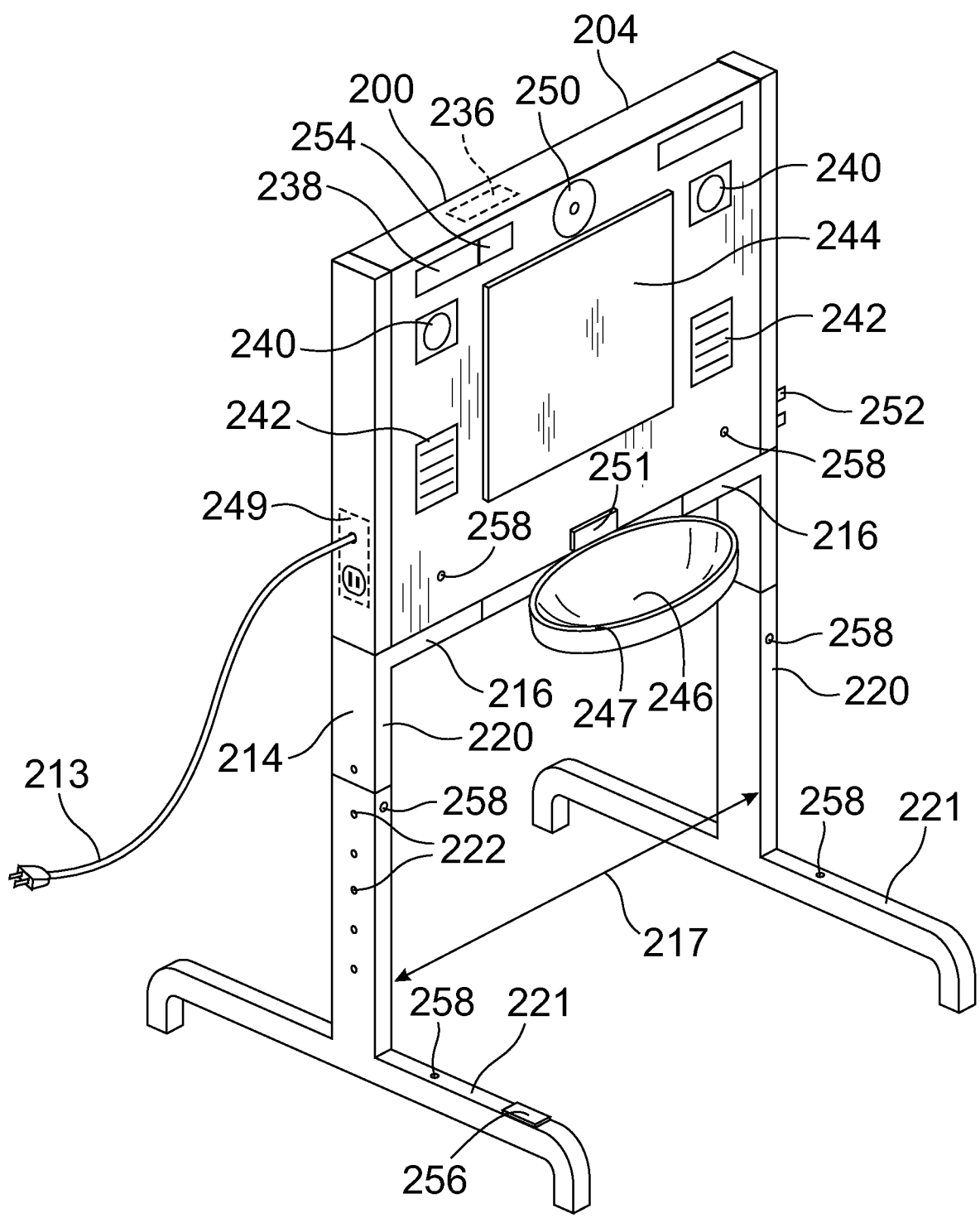
FIG. 3b depicts a perspective back view of the apparatus of FIG. 3a, but without the treadmill.

FIGS. 3a-3b depict a further embodiment of the invention, which can be similar (and in many ways identical) in operation and other characteristics to the device of FIGS. 1a-1c, except that the treadmill and pet motivational elements are separate devices. More specifically, in the embodiment of FIGS. 3a-3b a device 200 according to the invention includes a motivational control 204 positioned on a portable stand 214. The device 200 is configured for use with a separate exercise base, which in the embodiment depicted is a separate treadmill 202. Many pet owners already have treadmills for the pet owner's own use, and such treadmills typically have physical characteristics (length, width, height, etc.) which are conducive to the pet using the same treadmill. In such a case, it may be desirable for the pet to use the same treadmill that the owner uses. However, the controls for human treadmills are not typically configured for optimal use of the treadmill by a pet. The device 200 of the current embodiment of the invention is configured to interact with, and to control, the separate treadmill 202 in order for the pet to use the pet owner's own treadmill.

In the embodiment of FIGS. 3a-3b, a device 200 according to the invention is depicted with a separate treadmill 202. On a support 203 at the front of the treadmill 202 is a treadmill control 206 which controls operation of the treadmill motor 208, etc. The treadmill 202 has a power cord 210 which would normally (i.e., in the absence of the device 200) be secured directly to the wall socket 212; however, in the current embodiment of the invention the treadmill power cord 210 is plugged into the pet exercise device 200, with the pet exercise device 200 being plugged via its own power cord 213 into the wall socket 212.

The motivation control 204 is positioned on a stand 214 configured to be placed adjacent and/or over the treadmill 202. The stand 214 includes a horizontal bar 216 and supporting legs 220. The legs 220 may be adjustable in height (using, e.g., pins/sockets 222) in order to vary the height position of the horizontal bar 216 (and of the motivational control 204). The horizontal bar 216 may be adjustable in width in order to vary the distance 217 between the supporting legs 220. This variance in the distance 217 between the supporting legs 220 can enable the stand 214 to extend across treadmills having different widths. Typical over-the-counter treadmills for personal home use, which are envisioned as being used with the current invention, are typically in the range of 28" to 38" in overall width. Accordingly, the stand 214 may be configured to adjust the distance 217 within a similar range, e.g., to distances 217 of between 28" to 38" or more. The legs 220 in the embodiment depicted include feet 221 which prevent the device 200 from tipping forward or backward. The device 200 may also be configured to be removably secured directly to the treadmill itself.

As was the case with the prior embodiments, the treadmill 202 includes a treadmill tread surface 224, treadmill length 226, treadmill width 228, treadmill sides 230, treadmill front 232, and treadmill back 234. The treadmill 202 is supported by treadmill legs 235, which are entirely separate from the legs 220 of the device 200. The treadmill 202 is thus a stand-alone apparatus which the device 200 of the invention can control. Typical treadmills sold commercially for home use, which are envisioned for use with the current invention, have treadmill lengths of 50 to 60 inches, with treadmill belt widths of 16 to 22 inches. The overall treadmill width (e.g., including the frame and other structures on either side of the belt) of such treadmills are typically in the range of 28 to 38 inches or more.

The device 200 includes a computer 236, which is typically a part of the motivational control 204), and a motivational control panel 238 through which a user (e.g., pet owner, etc.) can input programming or other commands. The particular device of FIGS. 3a-3b also includes a digital readout 254, which serves to provide feedback for control panel inputs and can also function as a clock display, etc. The device 200 also includes one or more input/output ports 252, such as a USB port, through which the device 200 can communicate with a computer, the internet, etc.

The device 200 controls the speed of the treadmill 202 by varying the power provided to the treadmill 202 via the treadmill power cord 210. The device 200 receives electrical power from the wall socket 212 via the device's own power cord 213, and passes that power on to the treadmill 202 via the treadmill power cord 210. The device 200 includes a variable power circuit 249 configured to control the power received by the treadmill 202 from the wall socket 212. For example, if it is desired for the treadmill to be stopped entirely, the variable power circuit 249 will block all power from the wall socket 212, so that the treadmill power cord 210 receives no power. To start the treadmill, the variable power circuit 249 will permit a small amount of power to pass to the treadmill power cord 210. The amount of power will be further increased to provide further speed increases. To operate the treadmill at the maximum speed, the variable power circuit 249 will permit essentially full power from the wall socket 212 to pass to the treadmill power cord 210.

The device 200 may include one or more motivational-providing elements. The particular embodiment depicted includes several motivation-providing elements, including lights 240, speakers 242, an image display 244, and a food dispenser 246. The lights 240, speakers 242, image display 244, and food dispenser 246 are depicted as being positioned above the front of the treadmill surface 224, where a pet using the treadmill can easily focus on each of the motivation-providing elements. Note, however, that other positions for the motivational elements are also within the scope of the invention. The motivational providing elements are controlled by the motivational control 204 to provide motivation to the pet as desired, e.g., in the manners discussed with respect to FIGS. 1a through 2. The food dispenser 246 may include a feeding bowl 247 and a dispensing opening 251 through which food is dispensed.

In the particular embodiment of FIGS. 3a-3b, the device 200 includes a water bowl 256, which is depicted in one of the device feet 221 (although other positions are also within the scope of the invention, such as adjacent the food dispenser 246). The positioning of such a water bowl 256 in or on the device 200 can enable the pet 248 to drink while exercising, and also to help familiarize the pet 248 with the device 200 when not exercising.

The device 200 may include one or more sensors 258 configured to detect the presence and/or position of the pet on the treadmill 202. The sensors 258 are positioned in the stand 214, and can be on or in the legs 220 and/or horizontal bar 216. For example, sensors could be positioned (e.g., positioned in a foot 221 viewing upwards adjacent the treadmill side) to detect when a pet steps off the side of the treadmill. As was the case with the embodiment of FIGS.

1a-1c, input from the sensors 258 can be used to determine if the pet is in a position for proper exercise on the treadmill, and this information can be used to initiate and/or stop an exercise program.

The motivational control 204 can have the same features and capabilities as was the case for the embodiment of FIGS. 1a-1c, including the capability to call the pet to the treadmill, to confirm the safe position of the pet on the treadmill, to activate the treadmill (including varying the speed and/or intensity of the workout), and to provide motivation to the pet (e.g., audio, visual, aroma, and/or food motivation).

To set up the device 200 and treadmill 202, the user (e.g., pet owner) will place the device 200 over the treadmill 202 in a position such as that depicted in FIGS. 3a-3b. The user will plug the device power cord 213 into the wall socket 212, and plug the treadmill power cord 210 into the device 200. The user can activate the device 200, via the control panel 238, to provide full power from the wall socket 210 to the treadmill power cord 210. The user can then set the treadmill 202, using the treadmill controls 206, to operate at a set speed. This set speed of the treadmill 202 will be the maximum speed for which any programmed exercises for the pet can be conducted. Once the treadmill 202 is set at the set speed, the user can use the device control panel 238 to stop the treadmill 202 (by interrupting the power from the wall socket 212 to the treadmill power cord 210). The user can select and/or otherwise program desired exercise programs into the device 200 via the device control panel 238, and then leave. The device 200 and treadmill 202 will then be ready for use by the pet. The device 200 will, responsive to its programming, then call the pet to the treadmill 202, confirm the pet is safely positioned on the treadmill 202, activate the treadmill 202 to start (by providing power to the treadmill power cord 210), speed up the treadmill 202 (by increasing power to the treadmill power cord 210), slow down the treadmill 202 (by reducing power to the treadmill power cord 210), and stop the treadmill 202 (by cutting off all power to the treadmill power cord 210). The device 200 will also provide the appropriate motivations to the pet to encourage the pet to exercise on the treadmill 210.

In a further embodiment of the invention wherein the device is separate from the treadmill (or other exercise device), the motivational control of the device is configured to interact, via a connection (which can be wired or wireless), with the separate treadmill control of the treadmill. For example, the motivational control of the device may be directly plugged into, via a USB cable or similar connection (wired or wireless), to provide commands directly to the separate treadmill control of the treadmill. In such an embodiment, the motivation control of the device may have more control over the treadmill than would be achieved by merely adjusting the power levels to the treadmill (as is the case in the embodiment of FIGS. 3a-3b). For example, the motivation control of the device could, by directly providing commands to the treadmill control, vary not only the speed of the treadmill but also the incline of the treadmill surface (if the treadmill is configured to permit automatic adjustment of the incline).

In the embodiment of FIGS. 4a-4b, a device 200 according to the invention is depicted with a separate treadmill 202. On a support 203 at the front of the treadmill 202 is a treadmill control 206 which controls operation of the treadmill motor 208, etc. The treadmill 202 has a power cord 210 secured directly to the wall socket 212. A motivation control 270 has separate modules: a control module 272 and a motivational module 274. The control module 272, which may be a so-called smart phone (e.g., IPhone™), has a communications link with the treadmill control 206, which in the particular embodiment depicted is a wired connection 276 connecting the control module 272 to the treadmill control 206, which may be connected via USB ports, etc., on the respective connected elements. (Note that a wireless connection is also within the scope of the invention.) The control module 272 also has a communications link with the motivation module 274, which in the particular embodiment depicted is a wired connection 278 connecting the control module 272 to the motivation module 274, which may be connected via USB ports, etc., on the respective connected modules. (Note that a wireless connection is also within the scope of the invention.) The motivational module 274 may include a display screen 280 and/or one or more speakers 282, which may each be separable component modules. In the particular embodiment depicted, the motivational module 274 is removable secured to the treadmill assembly, and more specifically is hung via a hanger 284 from a handle 286 which is part of the treadmill assembly. With the motivation module 274 thus secured, the image display 280 (which may be configured to display videos and/or still images) is positioned generally at the eye level of the dog 248 using the treadmill.

One or more monitoring devices may be included. In the particular embodiment depicted, the monitoring devices include a camera 288 (e.g., a webcam or similar camera for receiving still and/or video images) facing rearward toward the pet 248, and position sensors 290 (such as in infrared, sonar, motion-sensing, etc., devices) which monitor the position of the pet 248 (e.g., with respect to the sides of the device, etc.). Note that the camera itself may, with the assistance of appropriate software (provided in the processor of the control module, the motivational module, and/or elsewhere, e.g., in a separate monitoring module) and processor which processes the images/video, be used to automatically determine if the animal 248 is properly (e.g., safely) positioned on the treadmill. The positioning of the animal 248 is provided by, and/or provided to, the control module 272. If the system does not determine the animal 248 to be in a proper position, the control module 272 will signal the treadmill control 206 to stop movement of the treadmill surface 224.

Note that a smart phone or other small personal processor (e.g., IPad™) may itself be used as both the control component and motivation component, and/or as a sensor component. While a smart phone may not typically have a display of sufficient size to provide motivational images/video to a pet, a smart phone could be used to provide motivational sounds while also controlling operation of the treadmill. In such an embodiment, the smart phone 272 could be placed at the front of the treadmill, e.g., as is shown in FIG. 4a, but without the presence of the separate motivation module 274. The animal would thus be drawn to the motivational sounds provided by the smart phone speaker. The smart phone may also include a camera such as webcam, in which case the smart phone could be positioned with the camera directed toward the area above the treadmill (i.e., the space the animal would occupy if using the treadmill) in order to monitor the animal and its position on the treadmill. The smart phone could thus monitor the animals position (and provide appropriate shutdown instructions to the treadmill if the animal was not determined to be in the proper exercise position, etc.), and could also provide images in real-time to a remote display (e.g., a separate smart phone remotely used by a remote human user) via wireless or other communications link.

FIG. 4b depicts a front view of a computer 300 which serves as motivation control and control component, and having a display 302, webcam 304, speakers 306, and sensor array 308, which can be hung from a treadmill structure in a similar position to that depicted in FIG. 4a for the motivation control 274.

Where a computer (e.g., IPad™) having a display screen of sufficient size is used as both control component and motivation component (and/or as sensor component), the small processor (with respective display screen) can be positioned on the treadmill assembly similar to the positioning of the motivation component 274 depicted in FIG. 4a. In such an embodiment, there would not be a separate control module (e.g., element 272), and the small processor having the motivation component and control component could be connected (via wired or wireless connection) directly to the treadmill control 206. The computer display would provide visual motivation to the animal, and the computer speakers could provide audio motivation to the animal. The computer camera (e.g., webcam), if so equipped, could provide real-time images/video to a remote viewer via an internet or similar connection, and/or could monitor the position of the animal on the treadmill (with the computer sending a shutdown signal to the treadmill if the animal was not determined to be in a safe position for exercise).

A device according to the invention may include multiple motivation modules, such as light module(s), speaker module(s), image module(s), food dispenser module(s), etc. One or more sensor modules may also be included, such as sensor modules which can be releasably secured to the sides of the treadmill to detect if an animal steps off of the side of the treadmill (thereby placing the animal in an improper position for exercise). These various modules can communicate with each other and/or with a control component/module, either wirelessly or wired connection.

A small smart phone or other computer (e.g., computer with sizable display for motivation component) may utilize prepared control software which can be downloaded to the computer, which may be performed via an internet-like connection from a remote server and database. The remote server and database may include multiple versions of the control software, with each version being specific to a particular treadmill model and/or smart phone/other computer model or operating system. The user could thus identify the particular model of treadmill, and/or any other component/modules being used (e.g., motivation and/or sensor modules), and the database could provide the appropriate control software for download to the smart phone or other control computer.

As discussed previously, the control software (e.g., a so-called "app") may include a database (or be selected from a database) of information regarding specific exercises, and also recommended exercise regimes based on particular animal species, breeds, ages, sex, overall animal health, or specific exercise needs (such as exercises specifically designed for a dog with hip dysplasia). For example, a user could identify the specific breed and age of the animal, as well as any health conditions of the animal, and the software and/or database could propose or otherwise provide suggested exercises (including exercise times/durations/frequencies). The computer could then control the treadmill to provide the desired operational speeds/times/frequencies. The computer could also provide appropriate motivation to the pet (either via the computer's own display/speakers/etc., or via separate motivation modules), and provide appropriate monitoring (via webcam, sensors, etc.) of the pet. The computer can also provide a communications link between the animal and remote human owner/supervisor, so that the human can monitor the pet's exercise remotely (e.g., via webcam and a remote display) and/or provide encouragement to the pet (e.g., via a remote microphone providing audio signals to the computer's speaker).

An apparatus according to the invention may be configured to be activated remotely by a human user (e.g., by sending a command over an internet connection) or at pre-programmed times during the day (e.g., with the pre-programmed times set in the on-board computer of the apparatus). The apparatus may also be configured to be activated by the pet, where the pet could use the unit when he wants to. For example, the pet could activate the apparatus by boarding the apparatus or otherwise positioning itself (i.e., the pet) at an appropriate position to activate the apparatus. The apparatus may use its positioning sensors to detect the pet's position. In one example, if the pet walks on to the treadmill or other exercise unit and is in a correct position, the sensors would activate the unit, giving a warning sound or signal or acknowledgment that it recognizes the pet and that the exercise and reward program was to begin. Therefore the pet could learn to choose his own exercise time period. The programming could be set so that the pet could only activate it at certain times of the day, and/or for a limited number of exercise periods. The programming may also be set to permit the pet to exercise as much or as little as it wanted. For people with multiple pets in a single household, the system may include collar-mounted identification tags (e.g., which provide RF or similar signals to the system) which specifically identify the particular animal. The system could thus recognize which particular animal was on the exercise unit, and operate the unit with the specific exercises (e.g., times/durations/intensities/frequencies) appropriate to the particular pet. For example, if a first pet in a household had already exceeded its maximum exercises for the day, but a second pet had not yet exercised enough, the system could recognize the respective pets and only operate when the second pet (and not the first pet) was on the treadmill.

The control component of the apparatus may include a calorie calculating program that calculates the calories being burned by the pet during exercise. The apparatus may also include a count of the calories in the edible rewards provided to the pet during exercise. The apparatus could thus provide the edible rewards in amounts to match (or otherwise be proportional to) the calories being burned during exercise. For example, if it was desired for a pet to lose weight, the apparatus could be configured to provide edible rewards having fewer total calories than the calories being burned by the pet during exercise. If it was not desired for the pet to lose weight, or if it were desired for the pet to gain weight (as in a growing puppy), the apparatus could be configured to provide edible rewards equal to the calories burned, or greater than the calories burned. If the edible rewards provided calories roughly equal to the calories burned by the pet, the apparatus could be configured to permit the pet to exercise as much as it wanted to, e.g., all day. The apparatus may also limit the overall calories burned by the pet on the apparatus by shutting down once the computer determined that the pet had burned a specific number of calories.

Although the invention has been described in terms of particular embodiments and applications, one of ordinary skill in the art, in light of this teaching, can generate additional embodiments and modifications without departing from the spirit of or exceeding the scope of the claimed invention. For example, although the above devices and methods are described for use in a particular manner, the devices and methods described herein could be used in a variety of different methods of use. As a further example, it will be recognized that the embodiments described above and aspects thereof may be modified, via changes in the exercise apparatus (e.g., substituting a so-called "stair-climber" exercise apparatus for the treadmills discussed above), etc., to adapt a particular situation or device to the teachings of the invention without departing from the essential scope thereof. Accordingly, it is to be understood that the drawings and descriptions of specific embodiments herein are proffered by way of example to facilitate comprehension of the invention, and should not be construed to limit the scope thereof.

What is claimed is:

1. A method for exercising a pet animal having an eye level, comprising:
    providing a treadmill device comprising a support frame, one or more rollers, a driving motor, and a treadmill belt, wherein the treadmill belt passes over the one or more rollers and defines a treadmill upper surface, treadmill lower surface, treadmill belt front end, and treadmill belt back end, wherein the driving motor drives rotational movement of the treadmill belt over the one or more rollers;
    providing a motivational control system communicatively linked to the treadmill, wherein the motivational control system comprises a control component and a motivational component, wherein the control component provides operational control signals to the treadmill and motivational control signals to the motivational component, the control component comprising a microprocessor and a memory, wherein the motivational component is configured, responsive to motivational control signals from the control component, to provide one or more exercise motivational signals to a pet animal which is standing on or adjacent the treadmill upper surface, wherein the motivational component comprises a food dispenser positioned toward the front of the treadmill device and configured to controllably release food;
    without physical presence of a human supervisor at the treadmill device, providing a startup signal from the control component to the treadmill to activate the driving motor and thereby cause the treadmill belt to rotate so that the treadmill upper surface moves in a direction from the front end to the back end of the treadmill belt;
    with the treadmill surface moving in a forward direction and without physical presence of a human supervisor at the treadmill device, activating the motivational component to provide one or more of the exercise motivational signals to encourage the pet animal to walk in a forward direction on the treadmill upper surface, wherein activating the motivational component comprises providing a motivational component activation signal from the control component to cause the motivational component to provide the one or more exercise motivation signals, wherein the motivational component is configured to provide a calling signal to encourage the pet animal to come to the treadmill and to step onto the treadmill surface, wherein the calling signal comprises the release of food from the food dispenser, the method further comprising:
    without physical presence of a human supervisor at the treadmill device, activating the motivational component to provide the calling signal to encourage the pet animal to come to the treadmill and to step onto the treadmill surface, wherein providing the calling signal is performed prior to activating the motivational component to provide the one or more exercise motivational signals.

2. A method for exercising a pet animal having an eye level, comprising:
    providing a treadmill device comprising a support frame, one or more rollers, a driving motor, and a treadmill belt, wherein the treadmill belt passes over the one or more rollers and defines a treadmill upper surface, treadmill lower surface, treadmill belt front end, and treadmill belt back end, wherein the driving motor drives rotational movement of the treadmill belt over the one or more rollers;
    providing a motivational control system communicatively linked to the treadmill, wherein the motivational control system comprises a control component and a motivational component, wherein the control component provides operational control signals to the treadmill and motivational control signals to the motivational component, the control component comprising a microprocessor and a memory, wherein the motivational component is configured, responsive to motivational control signals from the control component, to provide one or more exercise motivational signals to a pet animal which is standing on or adjacent the treadmill upper surface, wherein the motivational component comprises a food dispenser positioned toward the front of the treadmill device and configured to controllably release food;
    without physical presence of a human at the treadmill device, providing a startup signal from the control component to the treadmill to activate the driving motor and thereby cause the treadmill belt to rotate so that the treadmill upper surface moves in a direction from the front end to the back end of the treadmill belt;
    with the treadmill surface moving in a forward direction and without physical presence of a human at the treadmill device, activating the motivational component to provide one or more of the exercise motivational signals to encourage the pet animal to walk in a forward direction on the treadmill upper surface, wherein activating the motivational component comprises providing a motivational component activation signal from the control component to cause the motivational component to provide the one or more exercise motivational signals, and one of the exercise motivational signals comprises the release of food from the food dispenser, the method further comprising:
    releasing food from the food dispenser to motivate the pet animal to exercise.

3. The method of claim 2, wherein the motivational component comprises a speaker, and the one or more exercise motivational signals comprise a sound of a voice of an owner of the pet animal, and activating the motivational component to provide one or more of the exercise motivational signals comprises transmitting the sound of the voice of the owner via the speaker.

4. The method of claim 2, wherein the motivational component comprises a video display, and activating the motivational component to provide one or more of the exercise motivational signals comprises providing a moving video of a prey animal on the video display.

5. The method of claim 2, further comprising:
    providing a monitoring component, wherein the monitoring component is configured to monitor a position of the pet animal position on the treadmill surface;

without physical presence of a human at the treadmill device, monitoring the position of the pet animal on the upper treadmill surface via the monitoring component to detect whether the pet animal is in a proper exercise position; and upon detecting that the pet animal is not in a proper exercise position, and without physical presence of a human at the treadmill device and without any active human monitoring of the treadmill device, automatically ceasing rotation of the treadmill belt.

6. The method of claim 2, further comprising:

providing a monitoring component, wherein the monitoring component comprises a camera taking one or more images a space immediately above the upper treadmill surface;

monitoring the position of the pet animal on the upper treadmill surface with the monitoring component, comprising taking one or more images of the pet animal via the camera;

providing a remote monitoring device comprising a display configured to present received images to a human user;

providing a communication link between the monitoring component and the remote monitoring device;

without physical presence of a human at the treadmill device, transmitting the one or more images of the pet animal to the remote monitoring device via a real-time communication link, whereby a human user of the remote monitoring device can view the images of the pet animal in real-time.

7. The method of claim 2, wherein the motivational component comprises a speaker, the method further comprising:

providing a remote device comprising a microphone configured to receive sounds made by a human user and a transmitter configured to transmit signals corresponding to the sounds made by the human user;

providing a communication link between the monitoring motivational component and the remote device;

without physical presence of a human at the treadmill device, providing sounds from the human user to the microphone, transmitting signals corresponding to the sounds made by the human user from the remote device to the motivational component, and recreating the sounds provided by the human user to the pet animal via the speaker of the motivational component.

8. The method of claim 2, wherein the treadmill device is a specific model of treadmill and comprises a built-in control system, and the control component provides the operational signals to the treadmill built-in control system, and wherein the control component and motivational component are part of motivational control system computer having a memory and internal processor and display, wherein providing the motivational control system comprises providing to the motivational control system memory a control software which is specific to the specific model of treadmill, and further comprises hanging the motivation control system computer from a structure at the front of the treadmill device with the display facing back over the treadmill belt and with the display at the eye level of the pet animal.

9. The method of claim 2, wherein the treadmill device is a specific model of treadmill and comprises a built-in control system, and the control component provides the operational signals to the treadmill built-in control system, and wherein the control component and motivational component are part of motivational control system computer having a memory and internal processor and speaker, wherein providing the motivational control system comprises providing to the motivational control system memory a control software which is specific to the specific model of treadmill, and further comprises positioning the motivation control system computer on a structure at the front of the treadmill device.

10. A method for exercising a dog using a treadmill device comprising a support frame, one or more rollers, a driving motor, and a treadmill belt, wherein the treadmill belt passes over the one or more rollers and defines a treadmill upper surface, treadmill lower surface, treadmill belt front end, and treadmill belt back end, wherein the driving motor drives rotational movement of the treadmill belt over the one or more rollers, wherein the treadmill device is a commercially available treadmill device configured for use by a human user, the method comprising:

providing a motivational control system configured to be removably and communicatively linked to the treadmill, wherein the motivational control system is an after-market device purchased separately from the treadmill device, wherein the motivational control system comprises a control component and a motivational component, wherein the control component provides operational control signals to the treadmill and motivational control signals to the motivational component, the control component comprising a microprocessor and a memory, wherein the motivational component is configured, responsive to motivational control signals from the control component, to provide one or more exercise motivational signals to a dog which is standing on or adjacent the treadmill upper surface, wherein the motivational component comprises a food dispenser;

without physical presence of a human at the treadmill device, providing a startup signal from the control component to the treadmill to activate the driving motor and thereby cause the treadmill belt to rotate so that the treadmill upper surface moves in a direction from the front end to the back end of the treadmill belt;

with the treadmill surface moving in a forward direction and without physical presence of a human at the treadmill device, activating the motivational component to provide one or more of the exercise motivational signals to encourage the dog to walk in a forward direction on the treadmill upper surface, wherein activating the motivational component comprises providing a motivational component activation signal from the control component to cause the motivational component to provide the one or more exercise motivational signals, and wherein at least one exercise motivational signal comprises the release of food from the food dispenser.

11. A method for exercising a dog using a treadmill device comprising a support frame, one or more rollers, a driving motor, and a treadmill belt, wherein the treadmill belt passes over the one or more rollers and defines a treadmill upper surface, treadmill lower surface, treadmill belt front end, and treadmill belt back end, wherein the driving motor drives rotational movement of the treadmill belt over the one or more rollers, wherein the treadmill device is a commercially available treadmill device configured for use by a human user, the method comprising:

providing a motivational control system configured to be removably and communicatively linked to the treadmill, wherein the motivational control system is an after-market device purchased separately from the treadmill device, wherein the motivational control system comprises a control component and a motivational component, wherein the control component provides operational control signals to the treadmill and motivational control signals to the motivational component, the control component comprising a microprocessor and a memory, wherein the motivational component is configured, responsive to motivational control signals from the control component, to provide one or more exercise motivational signals to a dog which is standing on or adjacent the treadmill upper surface, wherein the motivational component provides a call signal to call the dog to the treadmill;

without physical presence of a human at the treadmill device, providing a startup signal from the control component to the treadmill to activate the driving motor and thereby cause the treadmill belt to rotate so that the treadmill upper surface moves in a direction from the front end to the back end of the treadmill belt;

with the treadmill surface moving in a forward direction and without physical presence of a human at the treadmill device, activating the motivational component to provide one or more of the exercise motivational signals to encourage the dog to walk in a forward direction on the treadmill upper surface, wherein activating the motivational component comprises providing a motivational component activation signal from the control component to cause the motivational component to provide the one or more exercise motivational signals, wherein the motivational component comprises a food dispenser, and wherein the call signal comprises the release of food from the food dispenser.

* * * * *